March 16, 1926.
A. S. HOWELL
1,577,030
INTERMITTENT FEED MECHANISM
Filed July 1, 1922
4 Sheets-Sheet 1
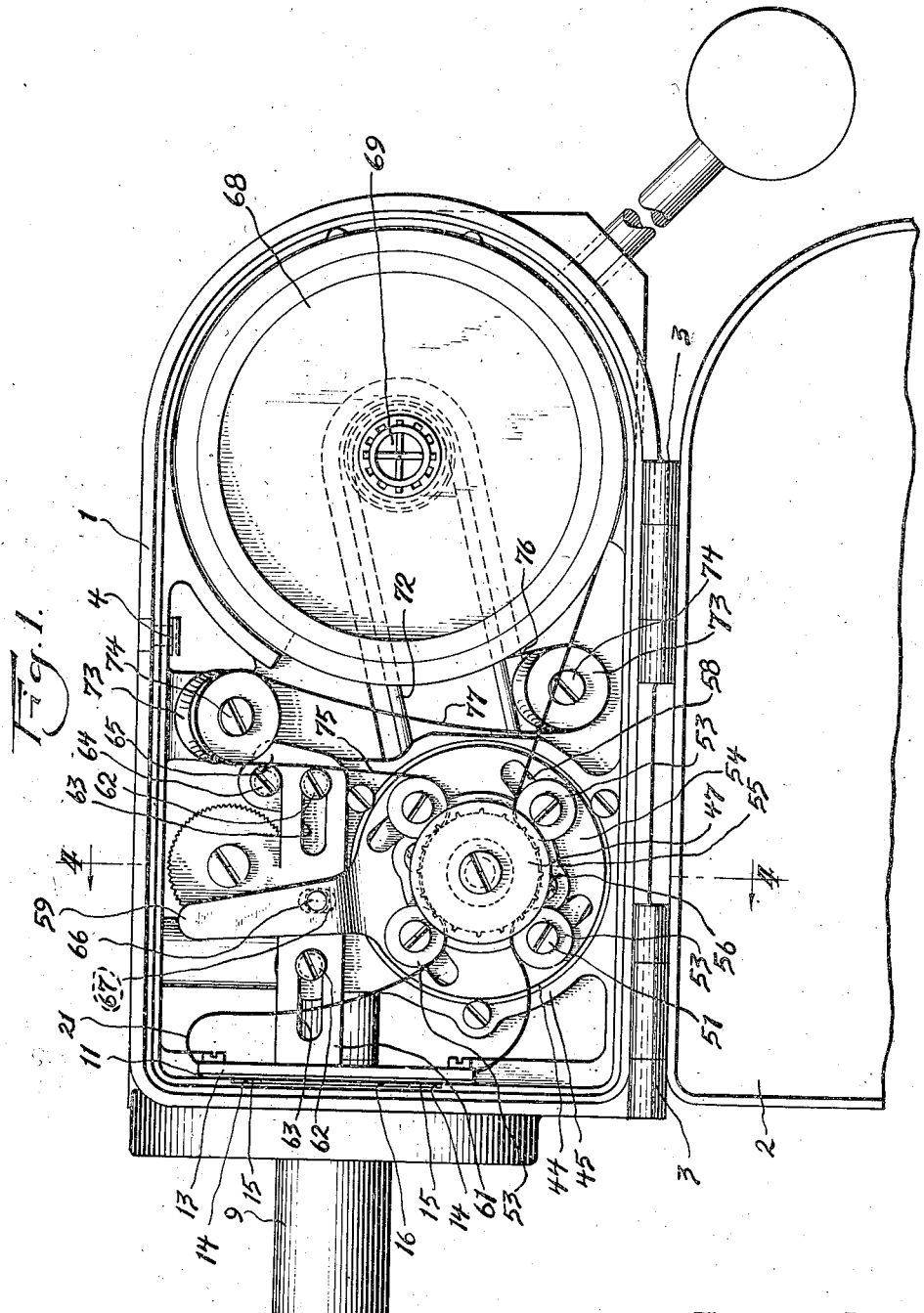
Inventor:
Albert S. Howell,
By Miehle + Miehle Atty.

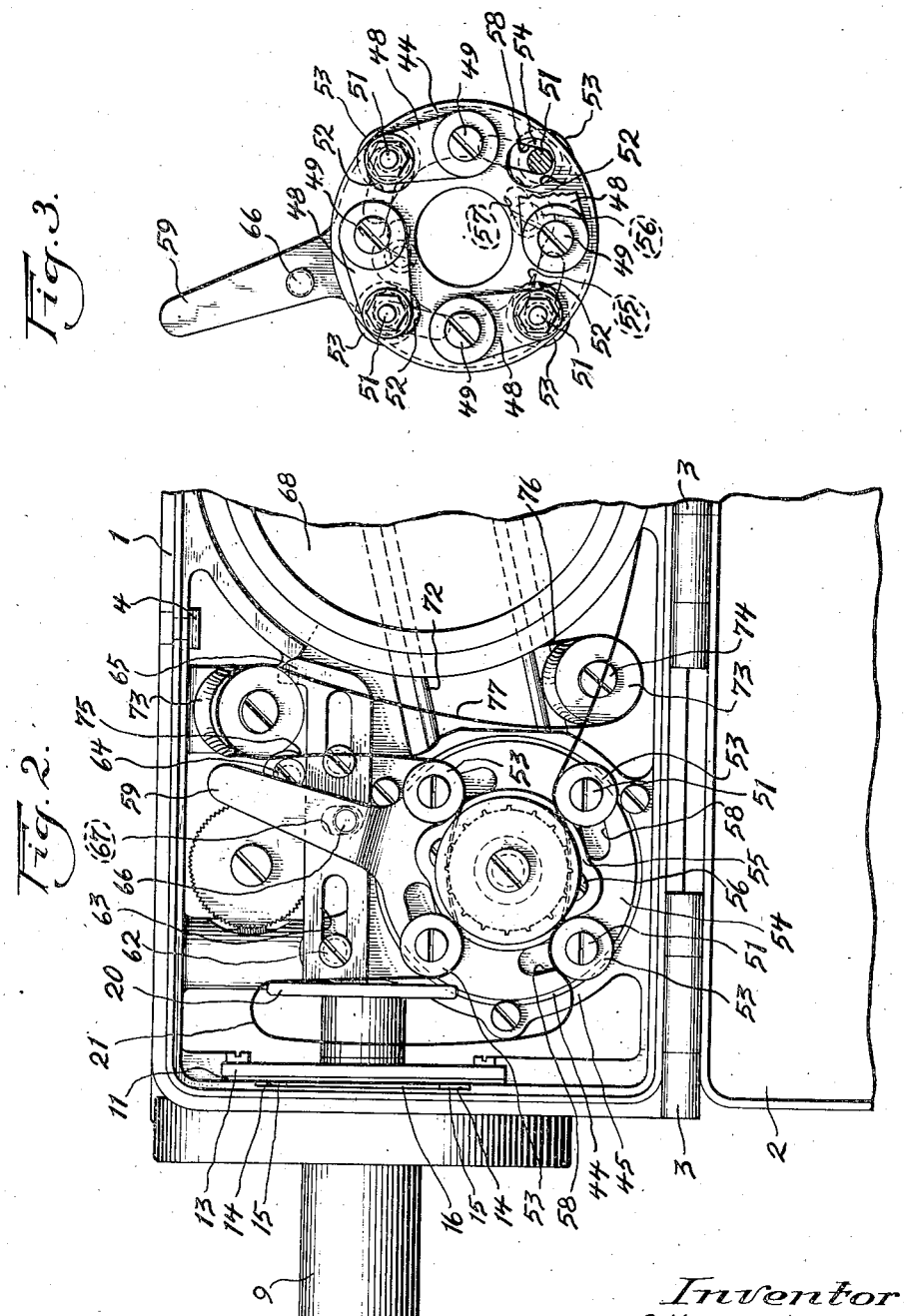

March 16, 1926.
A. S. HOWELL
1,577,030
INTERMITTENT FEED MECHANISM
Filed July 1, 1922      4 Sheets-Sheet 3
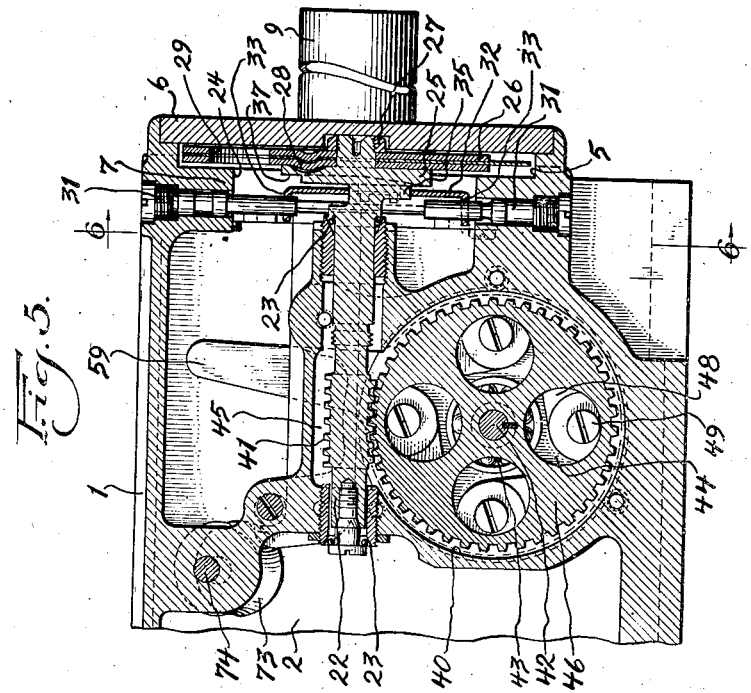
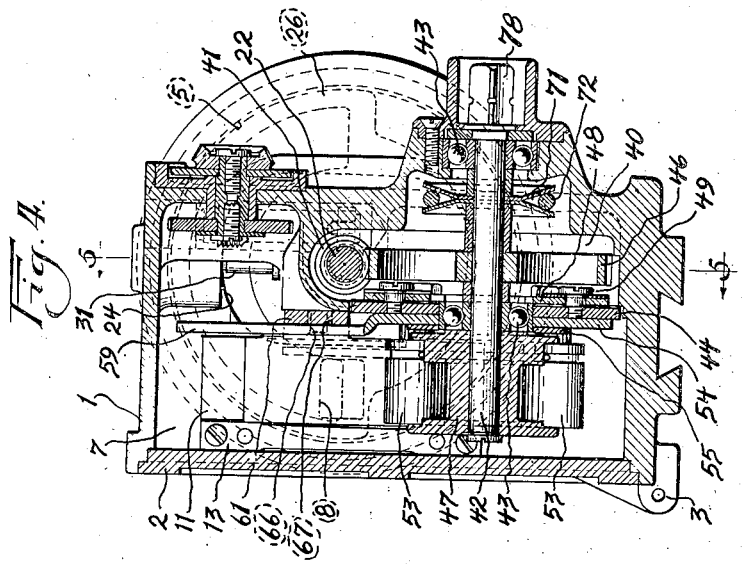
Inventor:
Albert S. Howell,
By Miehle & Miehle, Attys.

March 16, 1926.

A. S. HOWELL 1,577,030

INTERMITTENT FEED MECHANISM

Filed July 1, 1922   4 Sheets-Sheet 4

Inventor:
Albert S. Howell,
By Miehle & Miehle, Attys.

Patented Mar. 16, 1926.

1,577,030

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

INTERMITTENT FEED MECHANISM.

Application filed July 1, 1922. Serial No. 572,169.

*To all whom it may concern:*

Be it known that I, ALBERT S. HOWELL, a citizen of the United States, residing at Chicago, in the county of Cook and State of Illinois, have invented a certain new and useful Improvement in Intermittent Feed Mechanism, of which the following is a full, clear, concise, and exact description, reference being had to the accompanying drawings, forming a part of this specification.

My invention relates particularly to motion picture apparatus although many of the features thereof are not limited to this use alone.

The features of my invention relate to a simple, rugged, and accurate intermittent feed mechanism which is particularly adapted for feeding motion picture film, and which is adapted for motion picture apparatus involving the use of a revolving light shutter, the mechanism being quite compact and being admirably adapted for intermittently feeding film in the apertured film guides of motion picture apparatus.

With these features in view my invention consists in certain features of novelty in the construction, combination, and arrangement of parts by which the said features and certain other features hereinafter appearing are effected, all as fully described with reference to the accompanying drawings and more particularly pointed out in the claims.

In the said drawings—

Figure 1 is a view in side elevation of a motion picture camera embodying the features of my invention, with the door thereof in open position.

Figure 2 is a partial view similar to Fig. 1 showing certain parts in different positions.

Figure 3 is a side elevation of the film sprocket retaining roller assembly, hereinafter referred to, with parts broken away.

Figure 4 is a section taken on the line 4—4 of Fig. 1.

Figure 5 is a partial section taken on the line 5—5 of Fig. 4.

Like characters of reference indicate like parts in the several views.

Figure 6:
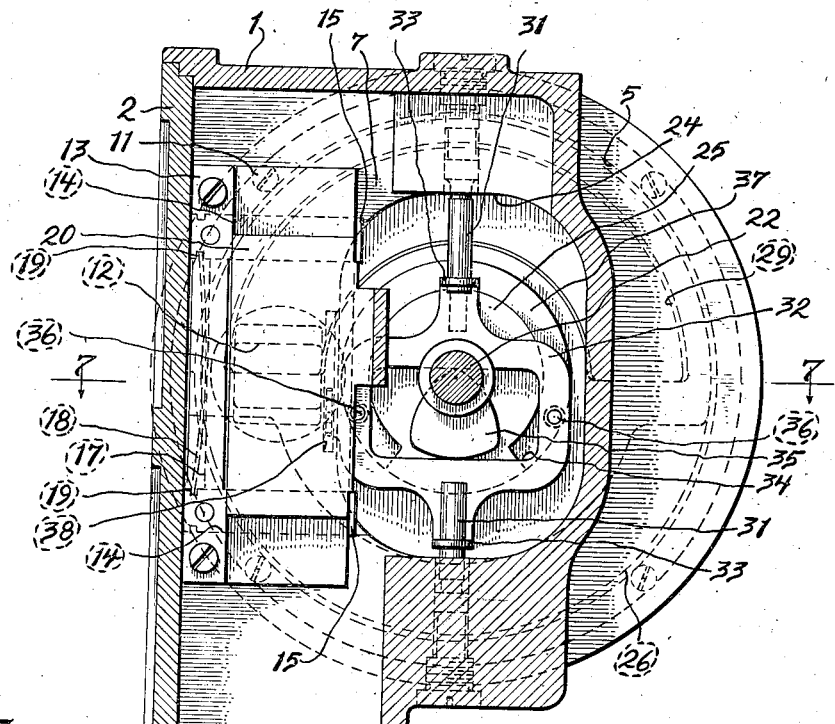
Figure 6 is a section taken on the line 6—6 of Fig. 5.
Figure 8:
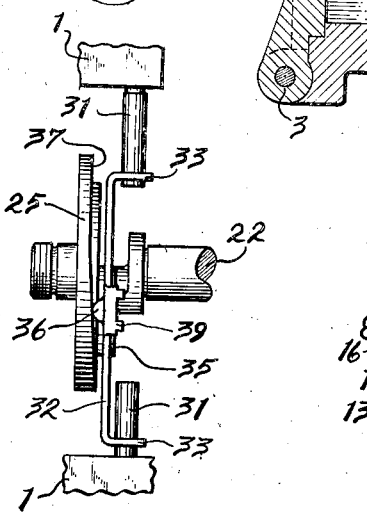
Figure 8 is a partial side elevation of the intermittent feed mechanism assembly.

In the said drawings 1 designates a boxlike frame forming an enclosure. One side of the frame is open and is closed by a door 2 hinged thereto at the bottom as shown at 3 and secured in closed position, as shown in Fig. 6, by a releasable latch 4, see Fig. 1, of usual construction, the door effecting a light tight enclosure of the open side of the frame when in closed position and permitting ingress to the inside of the frame when in open position as shown in Fig. 1. The forward end of the frame 1 has a circular transversely disposed shutter chamber 5 therein, and the forward end of this chamber is closed by a plate 6 secured to the frame. The frame 1 has a transverse wall formation 7 just back of the shutter chamber, and this wall formation has a rectangular light aperture 8 therethrough and communicating with the shutter chamber and disposed adjacent the periphery of the shutter chamber in horizontal central relation therewith on the side of the shutter chamber axis adjacent the open side of the frame. A camera lens 9 is mounted in a suitable opening 10 in the plate 6 in alinement with the aperture 8.

Figure 7:
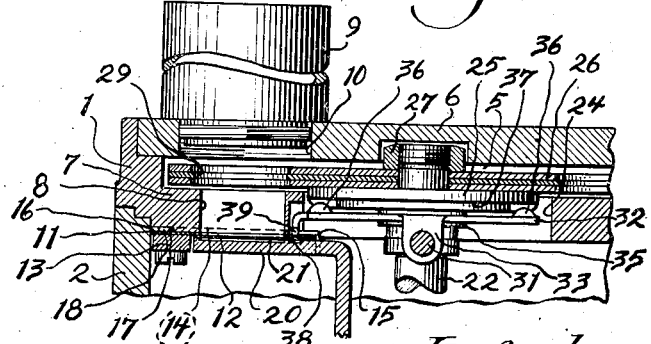
Figure 7 is a partial section taken on the line 7—7 of Fig. 6.

The rear face of the wall formation 7 surrounding the aperture 8 is disposed in a transverse vertical plane, and a front film face guide plate 11 is secured thereagainst and is provided with rectangular light aperture 12 registering with the aperture 8. See Figs. 1, 6, and 7. A vertical film edge guide rail 13 is secured against the rear face of the plate 11 and is disposed to the side of the aperture 12 adjacent the open side of the frame 1. The rear face of the wall formation 7 covered by the plate 11 is provided with a pair of spaced transverse grooves 14 of rectilinear cross section and disposed respectively above and below apertures 8 and 12. L-shaped film edge guide members 15 of rectilinear cross section corresponding with the section of the transverse grooves have one leg thereof engaged in respective grooves 14 for transverse movement therein and have their other leg to the side of the inner vertical edge of the plate 11 and extending rearwardly beyond the rear face of the plate. See Figs. 6 and 7. The said rear face of the wall formation 7 covered by the plate 11 is provided with a vertically extending shallow depression 16 at the outer side of the apertures 8 and 12 which extends between the grooves 14 and communicates therewith. The depression has a vertical abrupt outwardly facing shoulder 17 at its inner side between it and said rear surface of the wall formation 7, and a bow spring 18 is disposed in said depression and has its center portion abutting said shoulder and has its ends engaged in transverse notches 19 formed in the transverse legs of the edge guide members 15 and facing the depression to spring press the guide members transversely in an outward direction toward the edge guide rail 13. The plate 11 maintains the guide members 15 and spring 18 from rearward movement and the bottom of the notches 19 maintain the spring 18 in proper vertical position. A rear film face guide plate 20, mounted in a manner hereinafter described, is disposed in back of the front film face guide 11 in parallelism therewith and completes the film guide. The film, designated at 21, is guided for vertical longitudinal movement in this guide with its faces opposing respective guide faces of the plates 11 and 20, and with its outer edge opposing the guide rail 13 and with its inner edge opposing the rearwardly extending legs of the edge guide members 15 which extend across the plane of the film. See Fig. 4. Tension is exerted on the film edgewise thereof, the edge guide members 15 under the influence of the spring 18 urging the film edgewise against the inner surface of the guide rail 13. The inner vertical edge of the plate 11 is disposed a slight distance outwardly of the inner edge of the film to permit the guide members functioning when the width of the film is slightly below standard, and the plate 20 has portions cut away, as shown in Fig. 6, to permit functioning of the guide members 15 as above set forth. Thus is provided a simple and effective tensioning guide structure, and it will be noted that the guide members 15 are individually spring pressed by the spring 18 whereby they function separately and maintain the film with its outer edge in alinement with the guide surface of the guide rail 13 throughout its length and prevent edgewise skewing of the film though the width of the film may vary.

A shaft 22 is rotatably mounted within the frame 1 on spaced bearings 23 on an axis normal to the plane of the film in the guide and disposed to the side of the inner edge of the film and coaxial with the circular shutter chamber 5. See Figs. 4 and 5. This shaft extends forwardly into the shutter chamber through a large opening 24 formed in the transverse wall formation 7, and has an enlarged concentric disk formation 25 adjacent its front end. A revolving light shutter 26 within the shutter chamber is secured on the forward end of the shaft by means of a nut 27 screwthreaded on the forward end of the shaft and clamping the shutter against the forward face of the disk formation 25 of the shaft, a rearward projection 28 of the shutter engaging a corresponding recess in disk-like formation to positively time the shutter with respect the shaft. The shutter, as is usual, is provided with a light opening 29 and sweeps over the aperture 8 to interrupt the light in timed relation with an intermittent feeding of the film through the guide hereinabove described. See Figs. 5 and 7.

Disposed in alined and spaced relation above and below the shaft 22 on an axis disposed to the side of the inner edge of the film in the guide and parallel with the path of the film and intersected by the shaft axis is a pair of studs 31 which are secured respectively in thickened portions of the upper and lower walls of the frame 1. See Figs. 5, 6, 7, and 8. A shuttle plate 32 is disposed in a vertical plane immediately to the rear of the disk formation 25 of the shaft, and has reduced centrally disposed upper and lower end portions, the extreme ends 33 of which are turned laterally to the rear out of the plane of the plate at right angles thereto. These ends 33 are bored coaxially on an axis extending in parallelism and in central relation with the plate, and the studs 31 engage respective of these bores whereby the shuttle plate is mounted for pivotal movement on the stud axis and for movement therealong. The shuttle plate 32 is provided with a central aperture 34 elongated transversely of its pivotal axis and forming opposed surfaces extending transversely of the pivotal axis in intermediate relation with the studs. A radial cam 35 is formed on the shaft 22 immediately to the rear of the disk formation 25 and is engaged in said aperture 34 and operates upon said opposed surfaces to effect reciprocating film feeding and return movement of the shuttle plate along the studs during rotation of the shaft. The shuttle plate has a pair of forwardly projecting cam engaging projections 36 thereon disposed on opposite sides of the pivotal axis thereof and arranged centrally and disposed on opposite sides of the aperture 34, and an axial face cam 37 is formed on the rear face of the disk formation 25 in coaxial relation with the cam 35 and engages the cam engaging projections to effect oscillating film engaging and disengaging movement of the shuttle plate during rotation of the shaft. The shuttle plate lies in front of the front face guide plate 11 and overlaps the inner edge portion thereof between the edge guide members 15, the wall formation 7 having a recess therein to accommodate the same. See Fig. 7. The front face guide plate 11 has a vertically extending aperture 38 therethrough between the aperture 12 and the inner vertical edge thereof, and the portion of the shuttle plate which overlies this plate is provided with rearwardly projecting film engaging teeth 39 disposed to pass through the aperture 38 and engage usual perforations spaced longitudinally of the film 20 adjacent the inner edge thereof and alined with the aperture 38. The cams are arranged so that a closed path intermittent film feeding movement of the shuttle plate is effected during rotation of the shaft 22, and so that the film 20 is intermittently moved downwardly through the guide with rotation of the shaft counter-clockwise in Fig. 4. Each of the cams 35 and 37 permits movement of the shuttle plate by the other cam, and the cam 37 is arranged to maintain controlling relation with both cam engaging projections 36 throughout the cycle of the mechanism. The shutter 26 is timed with the cams 35 and 37 to expose the position of the film at the light apertures 8 and 12 to the light from the lens 9 during each rest period of the film in the guide and to interrupt this light during each feeding period of the film in a usual manner.

Thus is provided a simple and rugged intermittent feeding device which is well adapted for its purpose. Attention is directed to the preferred arrangement as shown where the space at the back of the light aperture as well as at the front thereof is unobstructed though the film is engaged by the shuttle immediately adjacent the light aperture, whereby the mechanism is particularly adapted for motion picture projecting machines as shown in my copending application, Serial No. 572,170, filed July 1, 1922, for improvement in motion picture projecting machine and the like, wherein is described and claimed certain features relating to a modification thereof.

An enclosure 40 is formed on the inside of the side wall of the frame 1 in back of the intermittent feeding mechanism, and the shaft 22 extends therethrough and has screw gear teeth 41 formed thereon between the bearings 23. See Figs. 4 and 5. A transverse shaft 42 extends through the enclosure 40 and is disposed below the shaft 22 and normal thereto. The shaft 42 is rotatably mounted on bearings 43, one of which is mounted in a bore of the side wall of the frame 1 and the other of which is mounted in a central opening of a plate 44 disposed normal to the shaft 42 and secured in a shouldered aperture of an intermediate partition 45 forming the enclosure 40 with the side wall of the frame. See Fig. 4. A screw gear 46 is secured on the shaft 42 within the enclosure 40 and meshes with the teeth 44 of the shaft 22 to form a driving connection therebetween. The shaft 42 extends from the bearing 43, which is mounted in the plate 44, toward the open side of the frame, and secured on the extending end of this shaft is a constant feed film sprocket 47 disposed in film feeding alinement with the hereinabove mentioned film guide. A plurality of arms 48 are disposed on the side of the plate 44 opposite that facing the sprocket and are pivotally secured to the plate on axes parallel to and spaced around the shaft 42 by means of headed screw studs 49. See Figs. 3, 4, and 5. Studs 51 are secured on respective arms 48 on axes parallel with the shaft 42 and extend therefrom through respective openings 52 in the plate 44, which are spaced around the shaft 42, out across the film sprocket. Film retaining rollers 53 are rotatably mounted on respective studs 51 and are adapted to retain the film on the sprocket. The rollers by reason of their being carried by the arms 48 are adapted for movement into and out of film retaining position with respect the sprocket. A cam plate 54 is disposed normal to the shaft 42 between the plate 44 and the sprocket 47, and is provided with a central opening through which the shaft passes and which encircles the adjacent bearing 43. See Figs. 2, 3, and 4. This plate 54 lies against the plate 44, and an annular ring 55 is disposed between the plate 54 and the sprocket and is secured to the plate 44 by means of headed stud screws 56 passing through segment slots 57 in the plate 54 and screwthreaded into the plate 44. See Figs. 3 and 4. The cam plate 54 is thus mounted for pivotal movement on the axis of the shaft 42, and is provided with cam slots 58 spaced around the axis thereof and through which the studs 51 pass and engage. These cam slots are so arranged that upon pivotal movement of the cam plate 54 from the position shown in Fig. 1 clockwise in this figure to the position shown in Fig. 2 the rollers 53 are moved out of film retaining position with respect the film sprocket as shown in Fig. 2. Opposite movement of the cam plate from the position shown in Fig. 2 moves the rollers 53 into film retaining relation with the sprocket. An operating handle 59 is formed on the cam plate 54 and extends upwardly therefrom for the convenient movement of the cam plate. Thus is provided a simple, compact, and convenient film sprocket and retaining member device which is conveniently operated to lace and unlace the film, the mechanism providing for the simultaneous movement of all the retaining rollers into and out of film retaining position.

The rear film face guide plate 20 is mounted for rearward and forward movement to and from the face of the film 21 in the guide in the following manner. The plate 20 has a rearward extension 61 disposed to the side of the inner edge of the film, and this extension is mounted for rearward and forward movement on faces of suitable bosses of the frame 1 by means of headed screw studs 62 passing through horizontal rearwardly and forwardly extending slots 63 in the extension and screwthreaded into said bosses. See Figs. 1, 2, and 4.

An adjustable eccentric stud 64 is mounted in the frame and is engaged by a vertical projection 65 of the extension to limit forward movement of the plate 20. The operating handle 59 overlies the extension 61 and is provided with a stud 66 which engages a vertical slot 67 in the extension to operate the plate 20 with pivotal movement of the cam plate 54. Fig. 1 shows the film laced with the retaining members in film retaining relation and Fig. 2 shows the retaining members out of film retaining position. It will be observed that forward movement of the handle effects movement of the rollers 53 into film retaining relation with respect the sprocket 47 and this same movement effects movement of the plate 20 into film retaining position whereby the film retaining members of the several feeding devices are controlled and operated by a common control means.

The screw teeth 41 and the teeth of the screw gear 46 are so pitched that rotation of the shaft 42 counter-clockwise in Figs. 1 and 2 effects rotation of the shaft 22 counter-clockwise in Fig. 4, and the film is fed over the top of the sprocket 47, the two upper rollers 53 retaining this portion on the sprocket, to the top of the film guide through which it is fed downwardly, and it returns from the lower end of the film guide rearwardly under the film sprocket, the two lower rollers 53 retaining this portion on the sprocket. See Fig. 1.

Disposed at the rear end of the enclosure of the frame 1 to the rear of the film sprocket 47 is a pair of coaxial film magazines 68 which are disposed in parallelism with the sprocket with the outer magazine in film feeding alinement with the sprocket and with the inner magazine offset edgewise of the film on the sprocket. The spools of these magazines are operated in alternation with opposite operation of the camera mechanism by a take up mechanism generally indicated at 69 which is operated from the shaft 42 by a pulley 71 secured on the shaft 42 within the enclosure 40 and a belt 72 engaged with said pulley and extending rearwardly therefrom in an inset passage in the side wall of the frame 1. See Figs 1, 2, and 4. The magazines and take up mechanism are fully described and claimed in my copending application, Serial No. 578,444, filed July 29, 1922, for improvement in motion picture machine, and do not require further description or illustration for the present purpose.

The portion of the film lying beneath the film sprocket 47 leads rearwardly therefrom and enters the outer film magazine. Vertically spaced between the film sprocket 47 and the film magazines 68 is a pair of guide rollers 73, which are rotatably mounted by means of headed screw studs 74 secured on respective bosses on the frame 1. See Figs. 1 and 2. The rollers 73 are disposed to form reverse bights in the film between the sprocket and the inner magazine and to extend diagonally in the same direction across respective path sections 75 and 76 of this portion of the film leading respectively from the sprocket and the inner magazine to accommodate the edges of the film to induce a natural film path 77 between the guide rollers 73 extending diagonally from one of said path sections to the other of said path sections. The guide rollers 73 are concave to effect engagement of the film with the rollers only at the edges thereof to prevent scratching of the picture portion of the film. Thus the film is guided for longitudinal movement from one path section to another path section offset therefrom edgewise of the film in a simple, effective, and natural manner.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:—

Claims:

1. An intermittent film feeding mechanism including a film feeding shuttle mounted for pivotal movement and for movement along its pivotal axis and provided with spaced opposing surfaces extending transversely of its pivotal axis, a radial cam engaged between said surfaces to effect reciprocating movement of the shuttle along its pivotal axis, and a rotating axial cam for effecting oscillating movement of the shuttle on its pivotal axis and connected to rotate in timed relation with the radial cam whereby to effect closed path intermittent film feeding movement of the shuttle.

2. An intermittent film feeding mechanism including a film feed guide, a toothed film feeding shuttle adapted for engaging and advancing a perforated film in said guide and mounted for pivotal movement on and for movement along an axis disposed parallel with the path of a film in said guide and to the side of one edge of the film and provided with spaced opposing surfaces extending transversely of its pivotal axis, a rotating radial cam disposed to the side of said edge of the film and engaged between said surfaces to effect reciprocating film advance and return movement of the shuttle along its axis, and a rotating axial cam disposed to the side of said edge of the film and connected with said radial cam to rotate in timed relation therewith for effecting oscillating film engaging and disengaging movement of the shuttle whereby to effect closed path intermittent film feeding movement of the shuttle.

3. An intermittent film feeding mechanism including a pair of spaced and alined bearing studs, a film feeding shuttle mounted for pivotal movement thereon and for movement along the same, and means for effecting a closed path intermittent film feeding movement of the shuttle and disposed to operate on the shuttle at points intermediate with respect said studs.

4. An intermittent film feeding mechanism including a film feed guide, a pair of spaced and alined bearing studs disposed parallel with the path of a film in said guide and to the side of one edge of the film, a toothed film feed shuttle adapted for engaging and advancing a perforated film in said guide and mounted for pivotal movement on and for movement along said studs and provided with spaced opposing surfaces disposed intermediately with respect said studs and extending transversely of the axis thereof, a rotating radial cam between said surfaces and disposed to the side of said edge of the film on an axis normal to the plane of the film and intersecting the axis of the studs and operating upon said surfaces to effect reciprocating film advance and return movement of the shuttle along its pivotal axis, and a rotating axial cam disposed to the side of said edge of the film on an axis normal to the plane of the film and connected with said radial cam to rotate in timed relation therewith for effecting oscillating film engaging and disengaging movement of the shuttle whereby to effect closed path intermittent film feeding movement of the shuttle.

5. An intermittent film feeding mechanism including a pair of spaced and alined bearing studs, a toothed film feeding shuttle mounted for pivotal movement thereon and for movement along the same, and a pair of timed coaxial rotating cams for effecting a closed path intermittent film feeding movement of the shuttle on and along its pivotal axis and disposed on an axis normal to the axis of the studs and extending between the studs, one of said cams being a radial cam and controlling movement of the shuttle along the studs and the other cam being an axial cam and controlling pivotal movement of the shuttle.

6. An intermittent film feeding mechanism including a film feeding shuttle plate mounted for pivotal movement on and for movement along an axis extending along the plane thereof and provided with an opening elongated transversely of said axis, and means for effecting a closed path intermittent film feeding movement of the plate on and along its pivotal axis including a rotating member disposed on an axis extending through the plane of the plate and engaged in said opening and adapted for reciprocating the plate along its pivotal axis.

7. An intermittent film feeding mechanism including two alined and spaced bearings, a film feed shuttle mounted on said bearings for pivotal movement on the axis thereof and for movement along such axis and provided with an aperture disposed centrally with respect said bearings and said axis and elongated transversely of said axis, a rotating radial cam disposed on an axis normal to the pivotal axis of the plate and engaged in said aperture for effecting reciprocation of the plate along its pivotal axis, and a rotating axial cam for effecting oscillating movement of the plate and connected to rotate in timed relation with said radial cam whereby to effect a closed path film feeding movement of the plate.

8. An intermittent film feeding mechanism including a film feed guide, a toothed film feed shuttle plate disposed similarly with respect the plane of a film in said guide and extending to the side of one edge of the film and mounted for pivotal movement on an axis disposed to the side of said edge of the film and parallel with the path thereof, said plate being adapted to engage longitudinally spaced perforations in the film and provided with an aperture elongated transversely of its pivotal axis, a rotating radial cam disposed to the side of said edge of the film on an axis normal to the plane of the film in said guide and engaged in said aperture for effecting reciprocating film feeding and return movement of the plate along its pivotal axis and a rotating axial cam disposed to the side of said edge of the film on an axis normal to the plane of the film in the guide for effecting oscillating film engaging and disengaging movement of the plate on its pivotal axis and connected to rotate in timed relation with said radial cam whereby to effect closed path film feeding movement of the plate.

9. An intermittent film feeding mechanism including a film feed guide, a film feed shuttle plate disposed similarly with respect the plane of the film in said guide and extending to the side of one edge of the film in said guide, two alined bearings spaced along an axis disposed to the side of said edge of the film and parallel with the path of the film and intermediately supporting the plate for pivotal movement on said axis and for movement therealong being provided with teeth adapted to engage perforations in the film spaced along the same adjacent said edge thereof and being provided with an aperture and disposed centrally with respect said bearings and elongated transversely of the pivotal axis thereof, a rotating radial cam disposed to the side of said edge of the film on an axis normal to the plane of the film in said guide and engaged in said aperture for effecting reciprocating film feeding and return movement of the plate along its pivotal axis, and a rotating axial cam disposed to the side of said edge of the film on an axis normal to the plane of the film in said guide for effecting oscillating film engaging and disengaging movement of the plate on its pivotal axis and connected to rotate in timed relation with said radial cam whereby to effect closed path film feeding movement of the plate.

10. An intermittent film feeding mechanism including a film feed shuttle plate mounted for movement on and along an axis extending along the plane of the plate and having an aperture disposed centrally with respect said axis and elongated transversely of said axis, and a pair of coaxial cams fixed together for effecting closed path intermittent film feeding movement of the plate on and along its pivotal axis, one of said cams being a radial cam engaged in said aperture to effect reciprocating movement of the plate along its pivotal axis and the other cam being an axial face cam and operating upon the plate on opposite sides of the pivotal axis thereof to effect oscillating movement of the plate on said pivotal axis.

11. An intermittent film feeding mechanism including a film feeding shuttle plate mounted for pivotal movement on and for movement along an axis extending along of the plate in central relation with the plate, said plate having an aperture disposed centrally with respect said axis and elongated transversely of the axis and having a pair of cam engaging projections on one face thereof disposed on opposite sides of said axis and arranged centrally and on opposite sides of said aperture, and a pair of timed coaxial cams for effecting a closed path intermittent film feeding movement of the shuttle on and along its pivotal axis and disposed on an axis normal to the pivotal axis of the plate, one of said cams being a radial cam engaged in said aperture and the other cam being an axial face cam engaging said projections.

12. An intermittent film feeding mechanism including a film feed shuttle plate having a pair of spaced bearing portions extending therefrom and turned laterally out of the plane thereof and bored coaxially on an axis extending along the plane of the plate, a pair of spaced and alined bearing studs engaging respective bores and supporting the plate for movement on and along such axis, and means for effecting a closed path intermittent film feeding movement of the plate on and along its pivotal axis including a rotating member between said studs.

13. An intermittent feeding mechanism including a film feed shuttle plate having a pair of bearing portions at opposite extremities thereof and turned laterally out of the plane thereof in the same direction and bored coaxially on an axis extending along the plane of the plate in central relation with the plate, a pair of spaced and alined bearing studs engaging respective of said bores and supporting the plate for movement on and along such axis, said plate having a central aperture elongated transversely of said axis, and means for effecting a closed path intermittent film feeding movement of the plate on and along its pivotal axis including a rotating radial cam disposed on an axis extending through the plane of the plate and engaged in said aperture to control movement of the plate along its pivotal axis and an axial cam for controlling movement of the plate on its pivotal axis and connected to rotate in timed relation with said radial cam.

14. An intermittent film feeding mechanism including a shuttle plate having a pair of spaced bearing portions at opposite extremities thereof and turned laterally out of the plane thereof in the same direction and bored coaxially on an axis extending along the plane of the plate in central relation with the plate, a pair of spaced and alined bearing studs engaging respective of said bores and supporting the plate for movement on and along said axis, said plate having a central aperture elongated transversely of said axis, and a pair of timed coaxial rotating cams disposed on an axis normal to the pivotal axis of the plate and extending through said aperture for effecting a closed path intermittent film feeding movement of the plate on and along its pivotal axis, one of said cams being a radial cam engaged in said aperture to control movement of the plate along its pivotal axis and the other cam being an axial face cam operating on the plate on opposite sides of its pivotal axis to control pivotal movement of the plate.

In witness whereof I hereunto affix my signature this twenty-eighth day of June, 1922.

ALBERT S. HOWELL.